(12) United States Patent
Jones

(10) Patent No.: US 10,139,044 B2
(45) Date of Patent: Nov. 27, 2018

(54) MOUNTING SYSTEM FOR ACCESSORY

(71) Applicant: Moen Incorporated, North Olmsted, OH (US)

(72) Inventor: Kyle Clancy Jones, Avon, OH (US)

(73) Assignee: Moen Incorporated, North Olmsted, OH (US)

( * ) Notice: Subject to any disclaimer, the term of this patent is extended or adjusted under 35 U.S.C. 154(b) by 3 days.

(21) Appl. No.: 15/597,461

(22) Filed: May 17, 2017

(65) Prior Publication Data

US 2017/0336020 A1    Nov. 23, 2017

Related U.S. Application Data

(60) Provisional application No. 62/337,609, filed on May 17, 2016.

(51) Int. Cl.
*G01C 9/26* (2006.01)
*F16M 13/02* (2006.01)
*A47K 10/04* (2006.01)

(52) U.S. Cl.
CPC ............. *F16M 13/02* (2013.01); *A47K 10/04* (2013.01); *G01C 9/26* (2013.01)

(58) Field of Classification Search
CPC .......... E04G 5/06; F16M 13/02; A47K 10/04; A47K 10/00; G01C 9/26; G01C 9/24; G01C 9/28; G01C 9/34
USPC ............. 248/231.81, 228.7, 230.7, 303, 304, 248/309.2, 308, 315, 227.1, 227.4, 544; 211/16, 88.04, 119.009
See application file for complete search history.

(56) References Cited

U.S. PATENT DOCUMENTS

| | | | |
|---|---|---|---|
| 4,443,949 A | 4/1984 | Newton | |
| 5,092,057 A | 3/1992 | Hoenig, Sr. | |
| 5,103,573 A | 4/1992 | Ehling et al. | |
| 5,186,427 A * | 2/1993 | Semchuck | A47K 10/04 248/224.7 |
| 5,454,542 A | 10/1995 | Hart | |
| 5,581,900 A | 12/1996 | Payne | |
| 6,286,803 B1 | 9/2001 | Pellino et al. | |
| 6,470,585 B2 | 10/2002 | Barr | |
| 6,473,983 B1 | 11/2002 | Gier | |
| 6,574,880 B2 | 6/2003 | Lombardo | |
| 6,785,977 B1 | 9/2004 | Crichton | |
| 6,952,887 B2 * | 10/2005 | Muchnik | A47G 1/205 33/613 |
| 7,191,534 B2 | 3/2007 | Szumer et al. | |
| 7,234,245 B2 * | 6/2007 | Tatum | B25H 7/045 33/613 |
| 7,293,925 B1 * | 11/2007 | Sanseviero | A47G 1/205 33/613 |
| 7,946,051 B1 * | 5/2011 | Hannah | B25H 7/04 33/528 |
| 8,061,054 B2 | 11/2011 | Rabin | |
| 8,225,520 B2 | 7/2012 | Rabin | |
| 8,739,423 B1 | 6/2014 | Corium et al. | |
| 8,840,080 B1 * | 9/2014 | Gordon | F16M 13/02 248/216.4 |
| 9,095,976 B1 * | 8/2015 | Schoenebeck | B25H 7/045 |
| 9,555,540 B1 * | 1/2017 | Weitsman | B25H 7/045 |

(Continued)

*Primary Examiner* — Nkeisha Smith
(74) *Attorney, Agent, or Firm* — Calfee, Halter & Griswold LLP

(57) ABSTRACT

The present invention provides a mounting system for an accessory that simplifies the process for installing the accessory.

5 Claims, 6 Drawing Sheets

(56) References Cited

U.S. PATENT DOCUMENTS

| | | |
|---|---|---|
| 2002/0095812 A1 | 7/2002 | Newman |
| 2002/0189119 A1 | 12/2002 | High |
| 2004/0216319 A1* | 11/2004 | Muchnik ................ A47G 1/205 |
| | | 33/666 |
| 2009/0038170 A1* | 2/2009 | Shyr ...................... A47G 1/205 |
| | | 33/613 |
| 2009/0165315 A1 | 7/2009 | Rabin |
| 2009/0193674 A1* | 8/2009 | Megahed ............... A47G 1/205 |
| | | 33/666 |
| 2011/0174953 A1* | 7/2011 | Ruiz ...................... A47G 1/205 |
| | | 248/467 |
| 2013/0333233 A1 | 12/2013 | Esposito |
| 2015/0034794 A1* | 2/2015 | Durante .............. F16M 11/041 |
| | | 248/544 |

* cited by examiner

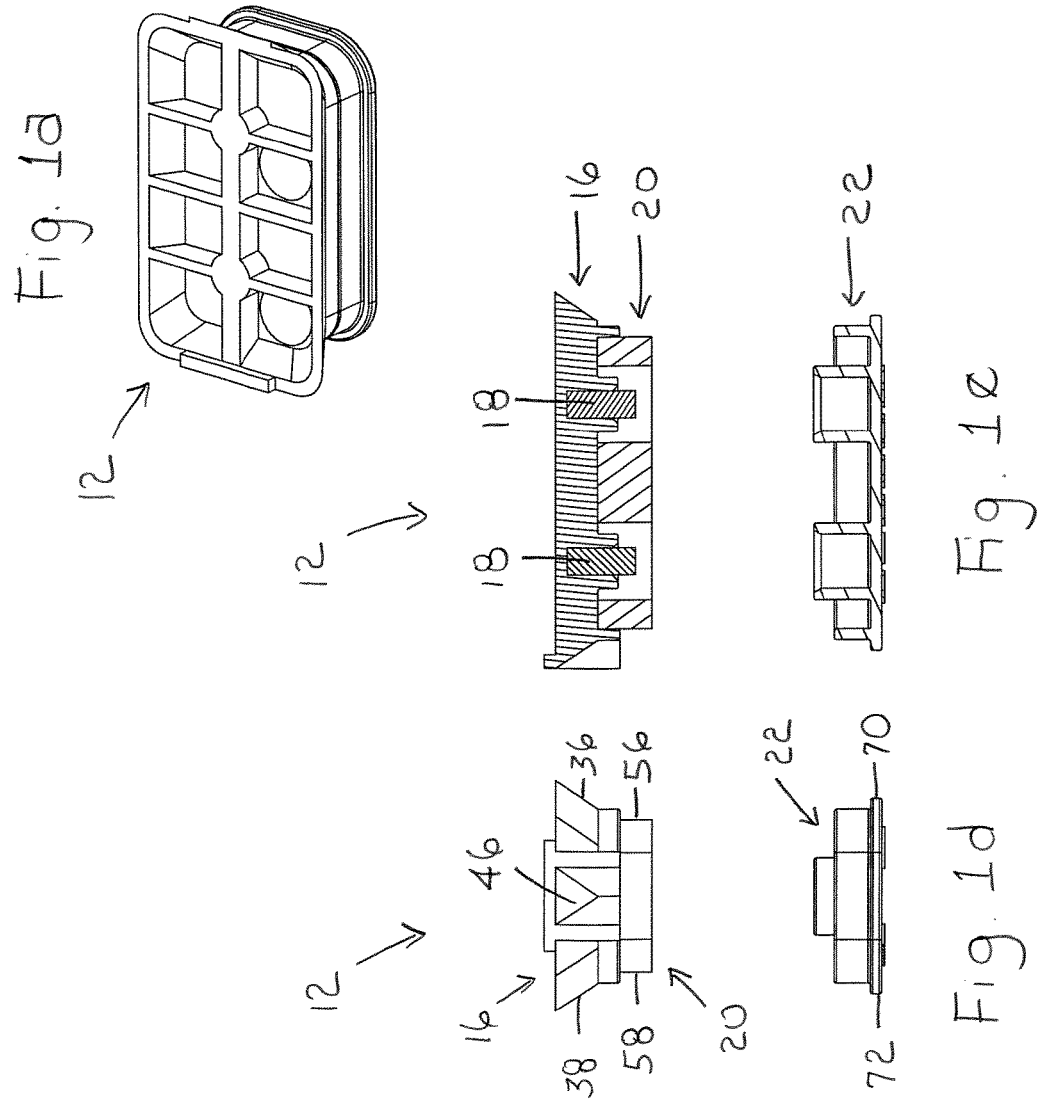

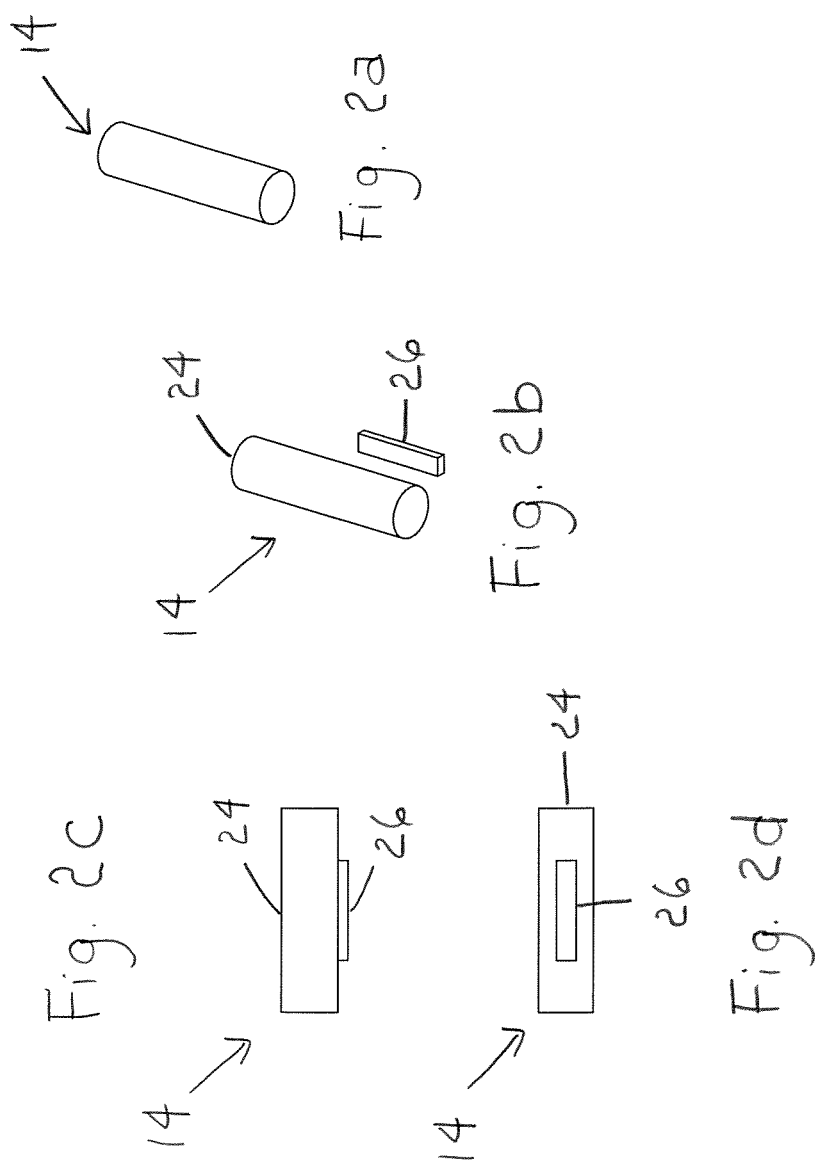

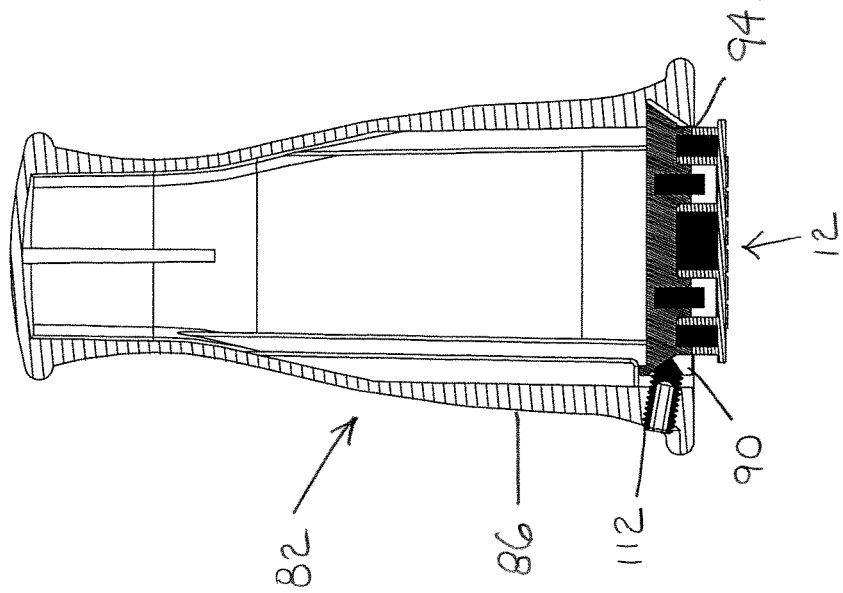
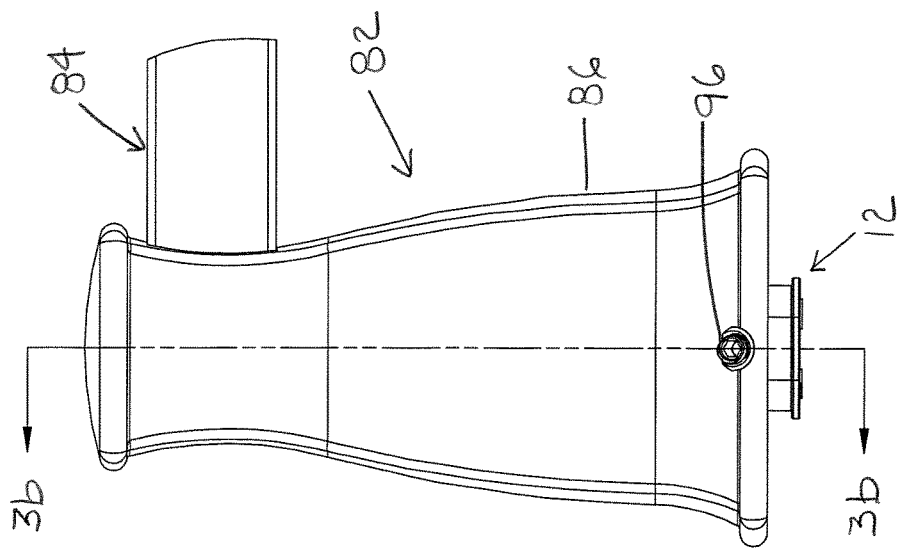

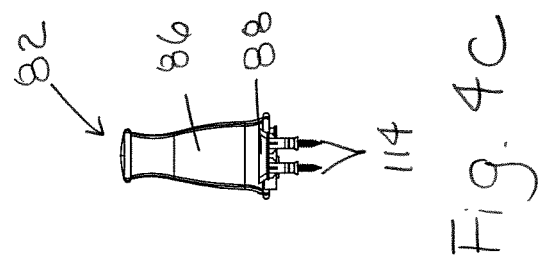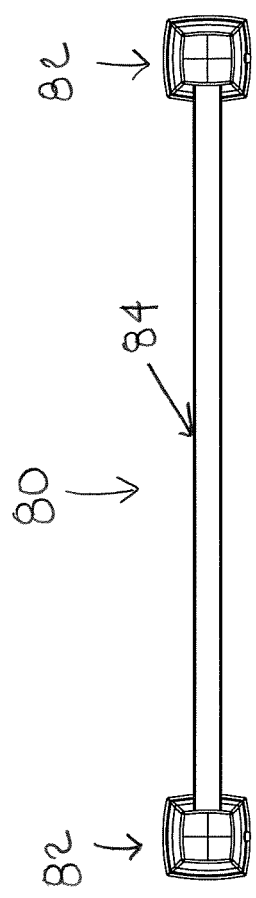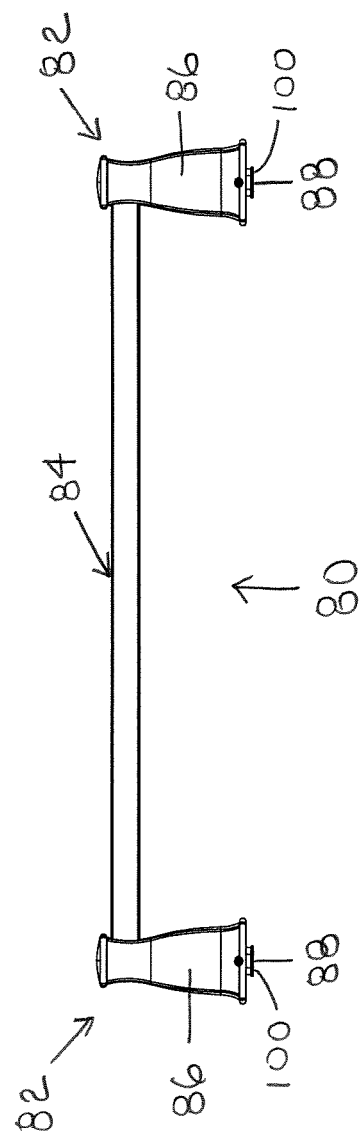

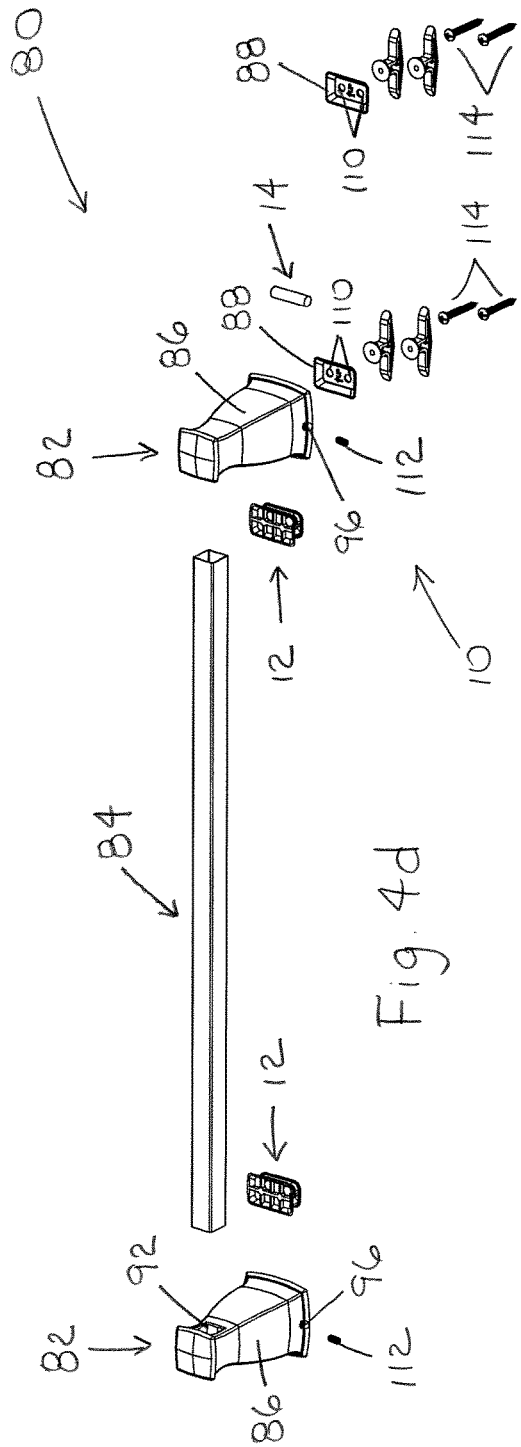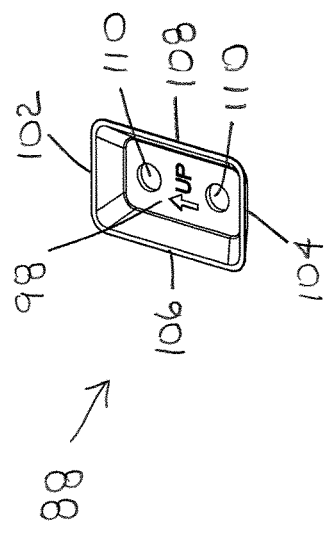

MOUNTING SYSTEM FOR ACCESSORY

CROSS-REFERENCE TO RELATED APPLICATION

This application claims the benefit of U.S. Provisional Application No. 62/337,609, filed May 17, 2016, the entire disclosure of which is hereby incorporated by reference.

FIELD

The present invention relates generally to a mounting system for an accessory and, more particularly, to a mounting system for an accessory that simplifies the process for installing the accessory.

BACKGROUND

The installation of accessories (e.g., towel bars, towel rings, toilet paper holders, and robe hooks) can be cumbersome and time consuming. A mounting system that simplifies the process for installing an accessory is desired.

SUMMARY

The present invention provides a mounting system for an accessory that simplifies the process for installing the accessory.

In an exemplary embodiment, the mounting system includes a marking assembly. The marking assembly includes a marker base, a marker element, and a marker pad. The marker base includes a front side. The front side includes at least one opening extending into the marker base from the front side. The marker element is operable to make a mark on a mounting surface. The marker element is operable to be inserted into the opening in the front side of the marker base. The marker pad includes a front side and a rear side. The front side is generally flat. The marker pad includes at least one opening extending from the front side through the rear side. When assembled, the opening in the marker pad generally aligns with the opening in the marker base. The marker pad is made from a compressible material. The marking assembly is operable to be secured in an accessory. The accessory can be placed against a mounting surface with the front side of the marking pad against the mounting surface. When the accessory is placed against the mounting surface with the marker pad uncompressed, the marker element does not contact the mounting surface. The accessory can be pushed against the mounting surface thereby compressing the marker pad and enabling the marker element to make a mark on the mounting surface.

In an exemplary embodiment, the mounting system includes a marking assembly and a leveling assembly. The marking assembly includes a marker base, a marker element, and a marker pad. The marker base includes a front side. The front side includes at least one opening extending into the marker base from the front side. The marker element is operable to make a mark on a mounting surface. The marker element is operable to be inserted into the opening in the front side of the marker base. The marker pad includes a front side and a rear side. The front side is generally flat. The marker pad includes at least one opening extending from the front side through the rear side. When assembled, the opening in the marker pad generally aligns with the opening in the marker base. The marker pad is made from a compressible material. The leveling assembly includes a level. The level is operable to be attached to the accessory. The marking assembly is operable to be secured in an accessory. The leveling assembly is operable to be secured to a portion of the accessory. The accessory can be placed against a mounting surface with the front side of the marking pad against the mounting surface. When the accessory is placed against the mounting surface with the marker pad uncompressed, the marker element does not contact the mounting surface. The leveling assembly can be used to level the accessory. Once the accessory has been leveled, the accessory can be pushed against the mounting surface thereby compressing the marker pad and enabling the marker element to make a mark on the mounting surface.

In an exemplary embodiment, the accessory and the mounting system therefor includes an accessory post, an accessory body, a marking assembly, and a leveling assembly. The accessory post includes a hub. The hub includes a rear opening. The marking assembly includes a marker base, a marker element, and a marker pad. The marker base includes a front side. The front side includes at least one opening extending into the marker base from the front side. The marker element is operable to make a mark on a mounting surface. The marker element is operable to be inserted into the opening in the front side of the marker base. The marker pad includes a front side and a rear side. The front side is generally flat. The marker pad includes at least one opening extending from the front side through the rear side. When assembled, the opening in the marker pad generally aligns with the opening in the marker base. The marker pad is made from a compressible material. The leveling assembly includes a level. The level is operable to be attached to the accessory. The marking assembly is operable to be secured in the rear opening in the hub of the accessory. The leveling assembly is operable to be secured to the body of the accessory. The accessory can be placed against a mounting surface with the front side of the marking pad against the mounting surface. When the accessory is placed against the mounting surface with the marker pad uncompressed, the marker element does not contact the mounting surface. The leveling assembly can be used to level the accessory. Once the accessory has been leveled, the accessory can be pushed against the mounting surface thereby compressing the marker pad and enabling the marker element to make a mark on the mounting surface.

BRIEF DESCRIPTION OF THE DRAWINGS

FIGS. 1a-1e are views of a marking assembly of an accessory mounting system according to an exemplary embodiment of the present invention—FIG. 1a is a rear-left side perspective view, FIG. 1b is an exploded rear-right side perspective view, FIG. 1c is an exploded front-right side perspective view, FIG. 1d is a partial exploded bottom view, and FIG. 1e is a partial exploded left side cross-sectional view;

FIGS. 2a-2d are views of a leveling assembly of an accessory mounting system according to an exemplary embodiment of the present invention—FIG. 2a is a perspective view, FIG. 2b is an exploded perspective view, FIG. 2c is a side view, and FIG. 2d is a bottom view;

FIGS. 3a-3b are views of the marking assembly of FIG. 1 installed in an accessory post for a towel bar—FIG. 3a is a top view, and FIG. 3b is a cross-sectional view taken along the line 3b-3b in FIG. 3a; and FIGS. 4a-4e are views of an accessory towel bar including the marking assembly and the leveling assembly of FIGS. 1 and 2—FIG. 4a is a front view, FIG. 4b is a bottom view, FIG. 4c is a cross-sectional side view of an accessory post of the accessory towel bar of FIGS. 4a-4b, FIG. 4d is an exploded perspective view, and FIG. 4e is a perspective view of a mounting plate of the accessory post of FIGS. 4b-4d.

DETAILED DESCRIPTION

Figure 1C:
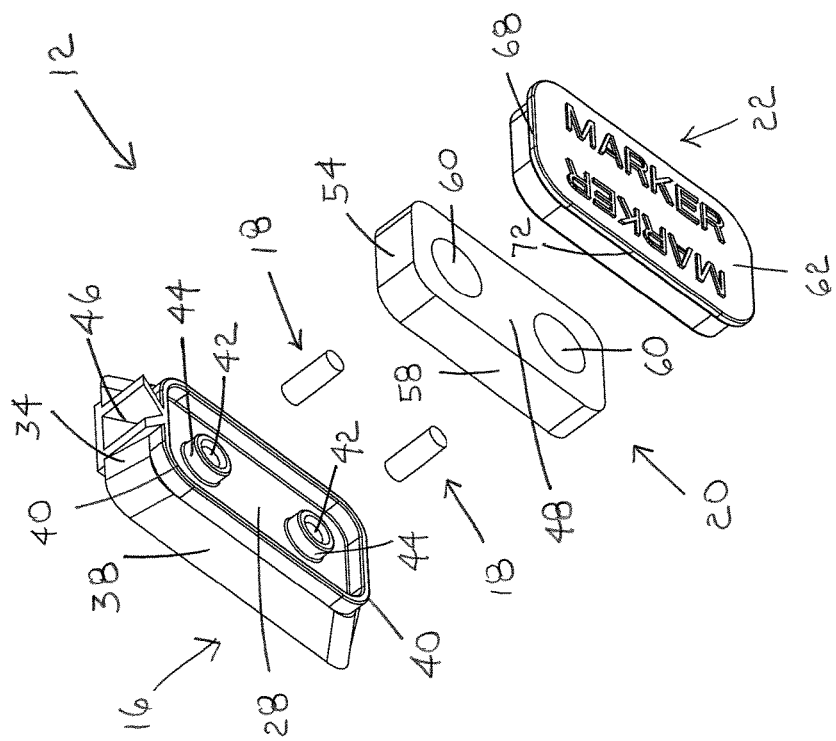

The present invention provides a mounting system for an accessory that simplifies the process for installing the accessory. In an exemplary embodiment, the accessory is a towel bar. However, one of ordinary skill in the art will appreciate that the accessory could be a towel ring, a toilet paper holder, a robe hook, or any other accessory.

An exemplary embodiment of a mounting system 10 for an accessory of the present invention is shown in detail in FIGS. 1a-4e. In an exemplary embodiment, the mounting system includes a marking assembly 12 and a leveling assembly 14. The marking assembly 12 includes a marker base 16, two marker elements 18, a marker pad 20, and a marker cap 22. The leveling assembly 14 includes a level 24 and adhesive 26.

An exemplary embodiment of the marker base 16 is shown in detail in FIGS. 1a-1e. In an exemplary embodiment, the marker base 16 includes a front side 28, a rear side 30, a top side 32, a bottom side 34, a left side 36, and a right side 38. In an exemplary embodiment, the front side 28 includes a rim 40 extending around a perimeter of the front side 28, two openings 42 extending into the marker base 16 from the front side 28, and two circular projections 44 extending from the front side 28 around the openings 42 in the front side 28. In the illustrated embodiment, the front side 28 is generally rectangular shaped. In the illustrated embodiment, the rear side 30 is generally rectangular shaped. In the illustrated embodiment, the top side 32, the bottom side 34, the left side 36, and the right side 38 are angled. In an exemplary embodiment, the bottom side 34 includes a notch 46. In the illustrated embodiment, the notch 46 is generally V-shaped.

Figure 1B:
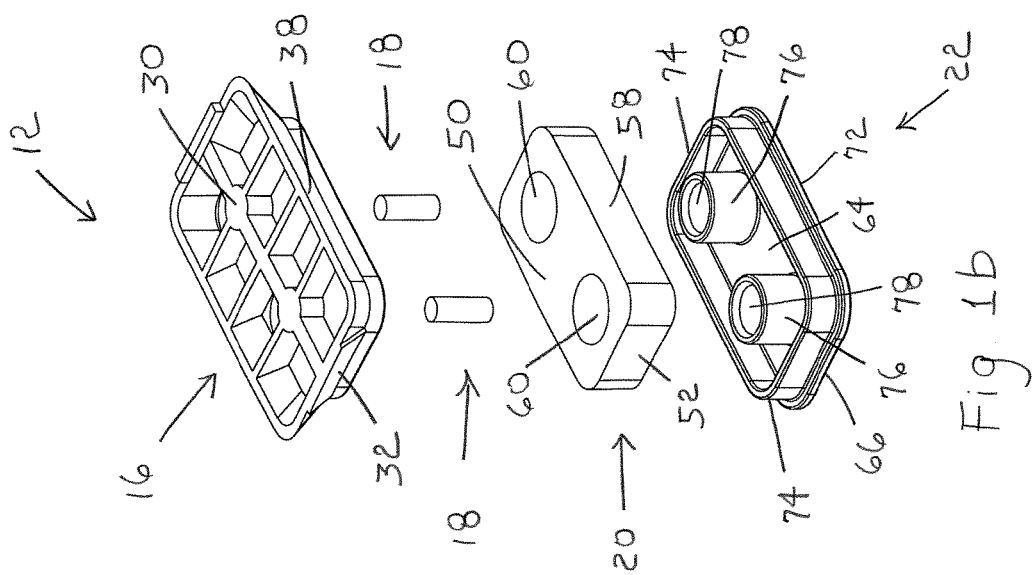

An exemplary embodiment of the marker element 18 is shown in detail in FIGS. 1b-1c and 1e. The marker element 18 is operable to make a mark on a mounting surface. In an exemplary embodiment, the marker element 18 is operable to be inserted into the opening 42 in the front side 28 of the marker base 16. In an exemplary embodiment, the marker element 18 includes ink for making the mark. In the illustrated embodiment, the marker element 18 is generally cylindrical shaped.

An exemplary embodiment of the marker pad 20 is shown in detail in FIGS. 1b-1e. In an exemplary embodiment, the marker pad 20 includes a front side 48, a rear side 50, a top side 52, a bottom side 54, a left side 56, and a right side 58. In an exemplary embodiment, the front side 48 is generally flat for placing against a mounting surface. In an exemplary embodiment, the marker pad 20 includes two openings 60 extending from the front side 48 through the rear side 50. When assembled, the openings 60 in the marker pad 20 generally align with the openings 42 in the front side 28 of the marker base 16. In an exemplary embodiment, the marker pad 20 is made of a compressible material, such as foam.

An exemplary embodiment of the marker cap 22 is shown in detail in FIGS. 1a-1e. In an exemplary embodiment, the marker cap 22 includes a front side 62, a rear side 64, a top side 66, a bottom side 68, a left side 70, and a right side 72. The rear side 64 includes a rim 74 extending around a perimeter of the rear side 64 and two circular projections 76 extending from the rear side 64 forming two openings 78. When assembled, the openings 78 in the rear side 64 of the marker cap 22 generally align with the openings 42 in the front side 28 of the marker base 16 and the openings 60 in the marker pad 20.

An exemplary embodiment of the level 24 is shown in detail in FIGS. 2a-2d. In an exemplary embodiment, the level 24 is a bubble level.

An exemplary embodiment of the adhesive 26 is shown in detail in FIGS. 2b-2d. In an exemplary embodiment, the adhesive 26 is tape. In an exemplary embodiment, the adhesive 26 is double-sided tape.

An exemplary embodiment of an accessory that can be installed using the mounting system is a towel bar. An exemplary embodiment of a towel bar 80 using the mounting system 10 is shown in detail in FIGS. 3a-4e. In an exemplary embodiment, the towel bar 80 includes two posts 82 and a bar 84. In an exemplary embodiment, each post 82 includes a hub 86 and a mounting plate 88.

An exemplary embodiment of the hub 86 is shown in detail in FIGS. 3a-4d. In an exemplary embodiment, each hub 86 includes a rear opening 90 that is operable to separately receive the marking assembly 12 and the mounting plate 88, and a front opening 92 that is operable to receive an end of the bar 84. In an exemplary embodiment, each hub 86 further includes a projection 94 extending radially into the rear opening 90 and a set screw opening 96.

An exemplary embodiment of the mounting plate 88 is shown in detail in FIGS. 4b-4e. In an exemplary embodiment, the mounting plate 88 includes a front side 98, a rear side 100, a top side 102, a bottom side 104, a left side 106, and a right side 108. In an exemplary embodiment, the mounting plate further includes two openings 110 extending from the front side 98 through the rear side 100. When separately received in the rear opening 90 in the hub 86, the openings 110 in the mounting plate 88 are generally in the same location as the openings 44 in the front side 28 of the marker base 16 and the openings 60 in the marker pad 20. In an exemplary embodiment, the top side 102, the bottom side 104, the left side 106, and the right side 108 are angled.

In an exemplary embodiment, the marking assembly 12 is preassembled. Exemplary assembly steps will be described. The marker elements 18 are inserted into the openings 42 in the front side 28 of the marker base 16. The marker elements 18 may be secured in the openings 42 in the front side 28 of the marker base 16 using an adhesive, such as glue. The marker pad 20 is inserted into the rim 40 on the front side 28 of the marker base 16. The marker pad 20 may be secured in the rim 40 on the front side 28 of the marker base 16 using an adhesive, such as glue. The marker cap 22 is placed over the marker pad 20 with the rim 74 on the rear side 64 of the marker cap 22 around the rim 40 on the front side 28 of the marker base 16.

In an exemplary embodiment, the leveling assembly 14 is preassembled. Exemplary assembly steps will be described. Backing is removed from a first side of the adhesive 26. The adhesive 26 is attached to the level 24.

In an exemplary embodiment, the towel bar 80 is preassembled. Exemplary assembly steps will be described. The marking assemblies 12 are inserted into the rear openings 90 in the hubs 86 with the top sides 32 of the marker bases 26 behind the projections 94 extending into the rear openings 90 in the hubs 86. Set screws 112 are inserted through the set screw openings 96 in the hubs 86 and into the notches 46 in the bottom sides 34 of the marker bases 16. The marking assemblies 12 are now secured in the hubs 86 with the marker caps 22 extending out of the hubs 86.

In an exemplary embodiment, the towel bar 80 is installed on a mounting surface. Exemplary installation steps will be described. Backing is removed from a second side of the adhesive 26 (which is attached to the level 24 of the leveling assembly 14). The level 24 is attached to the bar 84. The marker caps 22 are removed from the marking assemblies 12 in the hubs 86. One end of the bar 84 is inserted into the front opening 92 in each hub 86. The towel bar 80 is placed against the mounting surface in a location where it is desired to be mounted. The marker pads 20 should not be compressed. The towel bar 80 is leveled using the level 24. The hubs 86 are pushed into the mounting surface compressing the marker pads 20. Once the marker pads 20 are sufficiently compressed, the marker elements 18 will contact the mounting surface and leave marks on the mounting surface. The towel bar 80 is moved away from the mounting surface. Holes are drilled at the locations of the marks on the mounting surface. The mounting plates 88 are attached to the mounting surface via screws 114 extending through the openings 110 in the mounting plates 88 and into the holes in the mounting surface. The marking assemblies 12 are removed from the rear openings 90 in the hubs 86 by removing the set screws 112. The hubs 86 are attached to the mounting plates 88 by placing the hubs 86 over the mounting plates 88 with the top sides 102 of the mounting plates extending behind the projections 94 extending into the rear openings 90 in the hubs 86. The set screws 112 are inserted through the set screw openings 96 in the hubs 86 and behind the bottom sides 104 of the mounting plates 88. The leveling assembly 14 is removed from the bar 84. The towel bar 80 is now installed.

While the mounting system has been shown and described in the illustrated embodiment as including certain components, one of ordinary skill in the art will appreciate that the mounting system does not need to include each of these components.

While the mounting system has been shown and described in the illustrated embodiment with the components attached in a particular manner, one of ordinary skill in the art will appreciate that the components of the mounting system do not need to be attached in this particular manner.

One of ordinary skill in the art will now appreciate that the present invention provides a mounting system for an accessory that simplifies the process for installing the accessory. Although the present invention has been shown and described with reference to a particular embodiment, equivalent alterations and modifications will occur to those skilled in the art upon reading and understanding this specification. The present invention includes all such equivalent alterations and modifications.

What is claimed is:

1. An accessory mounting system, comprising:
a marking assembly, the marking assembly including:
 a marker base, the marker base including a front side, the front side of the marker base including an opening extending into the marker base from the front side of the marker base;
 a marker element, the marker element operable to make a mark on a mounting surface, the marker element operable to be inserted into the opening in the front side of the marker base; and
 a marker pad, the marker pad including a front side and a rear side, the front side of the marker pad being generally flat, the marker pad including an opening extending from the front side of the marker pad through the rear side of the marker pad, when assembled, the opening in the marker pad generally aligning with the opening in the marker base, the marker pad being made from a compressible material;
wherein the marking assembly is operable to be secured in an accessory;
wherein the accessory can be placed against a mounting surface with the front side of the marker pad against the mounting surface;
wherein, when the accessory is placed against the mounting surface with the marker pad uncompressed, the marker element does not contact the mounting surface;
wherein the accessory can be pushed against the mounting surface thereby compressing the marker pad and enabling the marker element to make a mark on the mounting surface; and
wherein the marking assembly further includes a marker cap, the marker cap including a rear side, the rear side of the marker cap including a rim extending around a perimeter of the rear side of the marker cap, the rear side of the marker cap including a projection extending from the rear side of the marker cap forming an opening, when assembled, the opening in the marker cap generally aligning with the opening in the marker base and the opening in the marker pad.

2. An accessory mounting system, comprising:
a marking assembly, the marking assembly including:
 a marker base, the marker base including a front side, the front side of the marker base including an opening extending into the marker base from the front side of the marker base;
 a marker element, the marker element operable to make a mark on a mounting surface, the marker element operable to be inserted into the opening in the front side of the marker base; and
 a marker pad, the marker pad including a front side and a rear side, the front side of the marker pad being generally flat, the marker pad including an opening extending from the front side of the marker pad through the rear side of the marker pad, when assembled, the opening in the marker pad generally aligning with the opening in the marker base, the marker pad being made from a compressible material; and
a leveling assembly, the leveling assembly including:
 a level, the level operable to be attached to the accessory;
wherein the marking assembly is operable to be secured in an accessory;
wherein the leveling assembly is operable to be secured to a portion of the accessory;
wherein the accessory can be placed against a mounting surface with the front side of the marker pad against the mounting surface;
wherein, when the accessory is placed against the mounting surface with the marker pad uncompressed, the marker element does not contact the mounting surface;
wherein the leveling assembly can be used to level the accessory;
wherein, once the accessory has been leveled, the accessory can be pushed against the mounting surface thereby compressing the marker pad and enabling the marker element to make a mark on the mounting surface; and
wherein the marking assembly further includes a marker cap, the marker cap including a rear side, the rear side of the marker cap including a rim extending around a perimeter of the rear side of the marker cap, the rear side of the marker cap including a projection extending from the rear side of the marker cap forming an opening, when assembled, the opening in the marker cap generally aligning with the opening in the marker base and the opening in the marker pad.

3. An accessory and mounting system therefor, comprising:
   an accessory post, the post including a hub, the hub including a rear opening;
   an accessory body;
   a marking assembly, the marking assembly including:
      a marker base, the marker base including a front side, the front side of the marker base including an opening extending into the marker base from the front side of the marker base;
      a marker element, the marker element operable to make a mark on a mounting surface, the marker element operable to be inserted into the opening in the front side of the marker base; and
      a marker pad, the marker pad including a front side and a rear side, the front side of the marker pad being generally flat, the marker pad including an opening extending from the front side of the marker pad through the rear side of the marker pad, when assembled, the opening in the marker pad generally aligning with the opening in the marker base, the marker pad being made from a compressible material; and
   a leveling assembly, the leveling assembly including:
      a level, the level operable to be attached to the accessory;
   wherein the marking assembly is operable to be secured in the rear opening in the hub of the accessory;
   wherein the leveling assembly is operable to be secured to the body of the accessory;
   wherein the accessory can be placed against a mounting surface with the front side of the marker pad against the mounting surface;
   wherein, when the accessory is placed against the mounting surface with the marker pad uncompressed, the marker element does not contact the mounting surface;
   wherein the leveling assembly can be used to level the accessory;
   wherein, once the accessory has been leveled, the accessory can be pushed against the mounting surface thereby compressing the marker pad and enabling the marker element to make a mark on the mounting surface; and
   wherein the front side of the marker base includes a rim extending around a perimeter of the front side of the marker base and a projection extending from the front side of the marker base around the opening in the front side of the marker base.

4. An accessory and mounting system therefor, comprising:
   an accessory post, the post including a hub, the hub including a rear opening;
   an accessory body;
   a marking assembly, the marking assembly including:
      a marker base, the marker base including a front side, the front side of the marker base including an opening extending into the marker base from the front side of the marker base;
      a marker element, the marker element operable to make a mark on a mounting surface, the marker element operable to be inserted into the opening in the front side of the marker base; and
      a marker pad, the marker pad including a front side and a rear side, the front side of the marker pad being generally flat, the marker pad including an opening extending from the front side of the marker pad through the rear side of the marker pad, when assembled, the opening in the marker pad generally aligning with the opening in the marker base, the marker pad being made from a compressible material; and
   a leveling assembly, the leveling assembly including:
      a level, the level operable to be attached to the accessory;
   wherein the marking assembly is operable to be secured in the rear opening in the hub of the accessory;
   wherein the leveling assembly is operable to be secured to the body of the accessory;
   wherein the accessory can be placed against a mounting surface with the front side of the marker pad against the mounting surface;
   wherein, when the accessory is placed against the mounting surface with the marker pad uncompressed, the marker element does not contact the mounting surface;
   wherein the leveling assembly can be used to level the accessory;
   wherein, once the accessory has been leveled, the accessory can be pushed against the mounting surface thereby compressing the marker pad and enabling the marker element to make a mark on the mounting surface; and
   wherein the marking assembly further includes a marker cap, the marker cap including a rear side, the rear side of the marker cap including a rim extending around a perimeter of the rear side of the marker cap, the rear side of the marker cap including a projection extending from the rear side of the marker cap forming an opening, when assembled, the opening in the marker cap generally aligning with the opening in the marker base and the opening in the marker pad.

5. An accessory and mounting system therefor, comprising:
   an accessory post, the post including a hub, the hub including a rear opening;
   an accessory body;
   a marking assembly, the marking assembly including:
      a marker base, the marker base including a front side, the front side of the marker base including an opening extending into the marker base from the front side of the marker base;
      a marker element, the marker element operable to make a mark on a mounting surface, the marker element operable to be inserted into the opening in the front side of the marker base; and
      a marker pad, the marker pad including a front side and a rear side, the front side of the marker pad being generally flat, the marker pad including an opening extending from the front side of the marker pad through the rear side of the marker pad, when assembled, the opening in the marker pad generally aligning with the opening in the marker base, the marker pad being made from a compressible material; and
   a leveling assembly, the leveling assembly including:
      a level, the level operable to be attached to the accessory;
   wherein the marking assembly is operable to be secured in the rear opening in the hub of the accessory;

wherein the leveling assembly is operable to be secured to the body of the accessory;

wherein the accessory can be placed against a mounting surface with the front side of the marker pad against the mounting surface;

wherein, when the accessory is placed against the mounting surface with the marker pad uncompressed, the marker element does not contact the mounting surface;

wherein the leveling assembly can be used to level the accessory;

wherein, once the accessory has been leveled, the accessory can be pushed against the mounting surface thereby compressing the marker pad and enabling the marker element to make a mark on the mounting surface; and wherein the accessory post further includes a mounting plate, the mounting plate including a front side and a rear side, the mounting plate including an opening extending from the front side of the mounting plate through the rear side of the mounting plate, when separately assembled, the opening in the mounting plate is generally in a same location as the opening in the marker base and the opening in the marker pad.

\* \* \* \* \*